United States Patent
Tanabe

(10) Patent No.: US 11,093,817 B2
(45) Date of Patent: Aug. 17, 2021

(54) INFORMATION PROCESSING DEVICE AND INFORMATION PROCESSING METHOD

(71) Applicant: FUJITSU LIMITED, Kawasaki (JP)

(72) Inventor: Satoshi Tanabe, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 940 days.

(21) Appl. No.: 15/819,292

(22) Filed: Nov. 21, 2017

(65) Prior Publication Data

US 2018/0165571 A1 Jun. 14, 2018

(30) Foreign Application Priority Data

Dec. 13, 2016 (JP) .............................. JP2016-241629

(51) Int. Cl.
 *G06N 3/04* (2006.01)
 *G06F 17/11* (2006.01)

(52) U.S. Cl.
 CPC ............... *G06N 3/04* (2013.01); *G06F 17/11* (2013.01); *G06N 3/0454* (2013.01)

(58) Field of Classification Search
 CPC .......... G06N 3/04; G06N 3/0454; G06F 17/11
 See application file for complete search history.

(56) References Cited

U.S. PATENT DOCUMENTS

| 3,922,536 A * | 11/1975 | Hampel ................ G06F 7/5443 708/446 |
| 5,720,002 A | 2/1998 | Wang |
| 9,626,621 B2 * | 4/2017 | Dognin ................. G10L 15/063 |
| 2016/0110642 A1 | 4/2016 | Matsuda et al. |

FOREIGN PATENT DOCUMENTS

| JP | 2-181284 | 7/1990 |
| JP | 6-35889 | 2/1994 |
| JP | 7-13949 | 1/1995 |
| JP | 2014-229124 | 12/2014 |

OTHER PUBLICATIONS

Oh, Sung-Kwun, Witold Pedrycz, and Byoung-Jun Park. "Polynomial neural networks architecture: analysis and design." Computers & Electrical Engineering 29.6 (2003): 703-725. (Year: 2003).*
Kim, Juyong, et al. "SplitNet: Learning to semantically split deep networks for parameter reduction and model parallelization." International Conference on Machine Learning. 2017. (Year: 2017).*

(Continued)

*Primary Examiner* — Paulinho E Smith
(74) *Attorney, Agent, or Firm* — Xsensus LLP

(57) ABSTRACT

An information processing device includes, a memory, and a processor coupled to the memory and the processor configured to, acquire a neural network, divide the neural network into divided neural networks, identify, based on input-output characteristics of the divided neural networks, parameters of each of polynomial neural networks corresponding to each of the divided neural networks, and output another neural network generated by linking the identified polynomial neural networks.

9 Claims, 20 Drawing Sheets

(56) References Cited

OTHER PUBLICATIONS

Roh, Seok-Beom, Sung-Kwun Oh, and Witold Pedrycz. "A fuzzy ensemble of parallel polynomial neural networks with information granules formed by fuzzy clustering." Knowledge-Based Systems 23.3 (2010): 202-219. (Year: 2010).*

Shankar, Sukrit, et al. "Refining architectures of deep convolutional neural networks." Proceedings of the IEEE Conference on Computer Vision and Pattern Recognition. 2016. (Year: 2016).*

Karnavas, Yannis L., and Demetrios P. Papadopoulos. "Excitation control of a synchronous machine using polynomial neural networks." Journal of Electrical Engineering—Bratislava—55.7/8 (2004): 169-179. (Year: 2004).*

Noboru Murata "An Integral Representation of Functions using Three-layered Networks and Their Approximation Bounds," Preprint submitted to Elsevier Science, Nov. 22, 1995, pp. 23.

Yu-Hsin Chen, et al. "Eyeriss: An Energy-Efficient Reconfigurable Accelerator for Deep Convolutional Neural Networks," ISSCC 2016, Session 14, Next-Generation Processing, 14.5, Feb. 2, 2016, pp. 3.

Lin-Lin Huang et al., "Face detection from cluttered images using a polynomial neural network," Elsevier, Neurocomputing, 51, 2003, pp. 15.

* cited by examiner

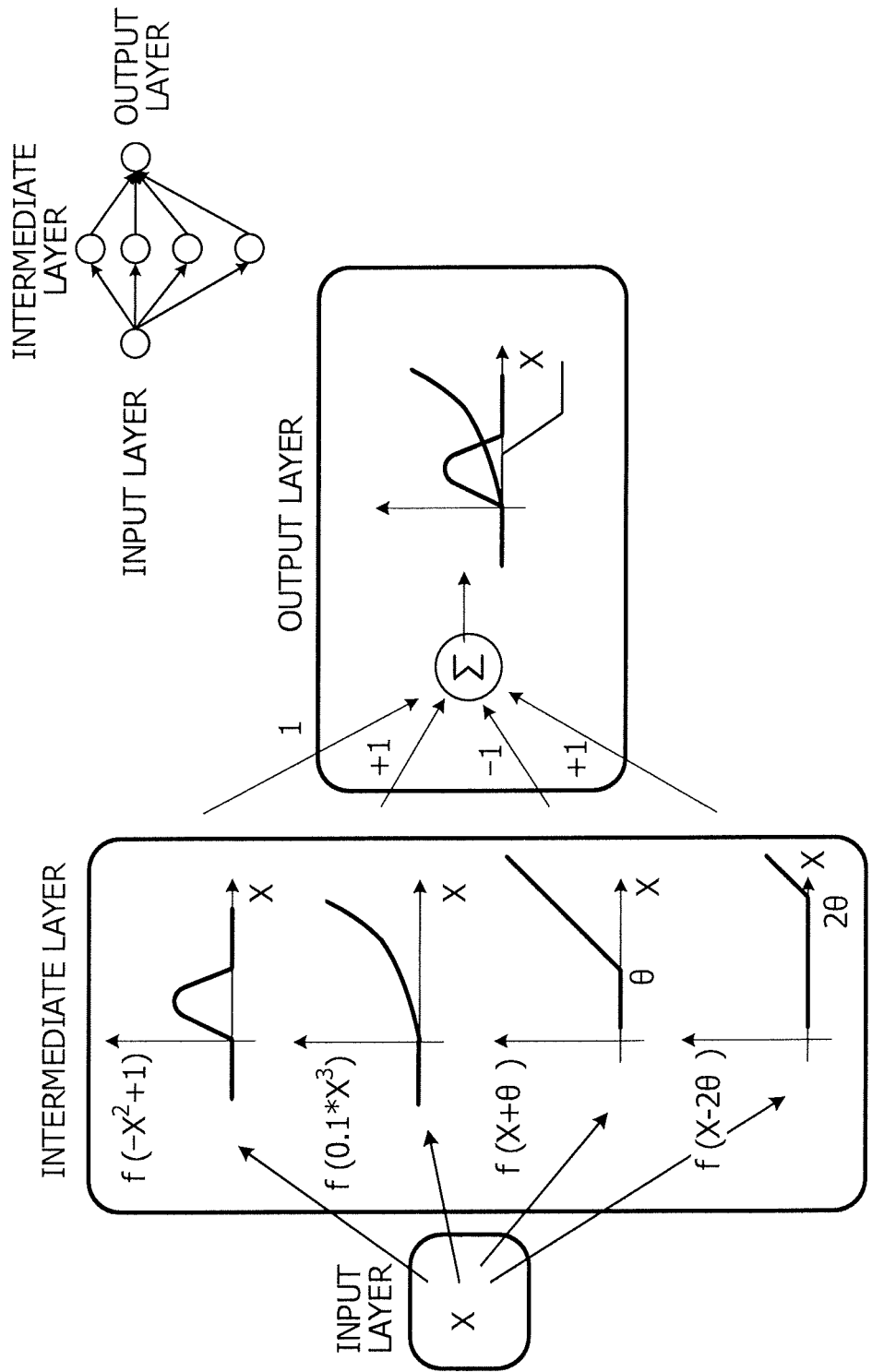

INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2016-241629, filed on Dec. 13, 2016, the entire contents of which are incorporated herein by reference.

FIELD

The embodiments discussed herein are related to an information processing device, and an information processing method for neural networks.

BACKGROUND

In the past, a signal processing technique utilizing a deep-layered neural network has been known (see, for example, Japanese Laid-open Patent Publication No. 7-13949).

SUMMARY

According to an aspect of the invention, An information processing device includes, a memory, and a processor coupled to the memory and the processor configured to, acquire a neural network, divide the neural network into divided neural networks, identify, based on input-output characteristics of the divided neural networks, parameters of each of polynomial neural networks corresponding to each of the divided neural networks, and output another neural network generated by linking the identified polynomial neural networks.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is an explanatory diagram illustrating a concept of function approximation in a three-layered polynomial neural network;

DESCRIPTION OF EMBODIMENTS

In the related art, there is a problem that arithmetic processing performance is decreased with an increase in the number of layers.

First Embodiment

Figure 1:
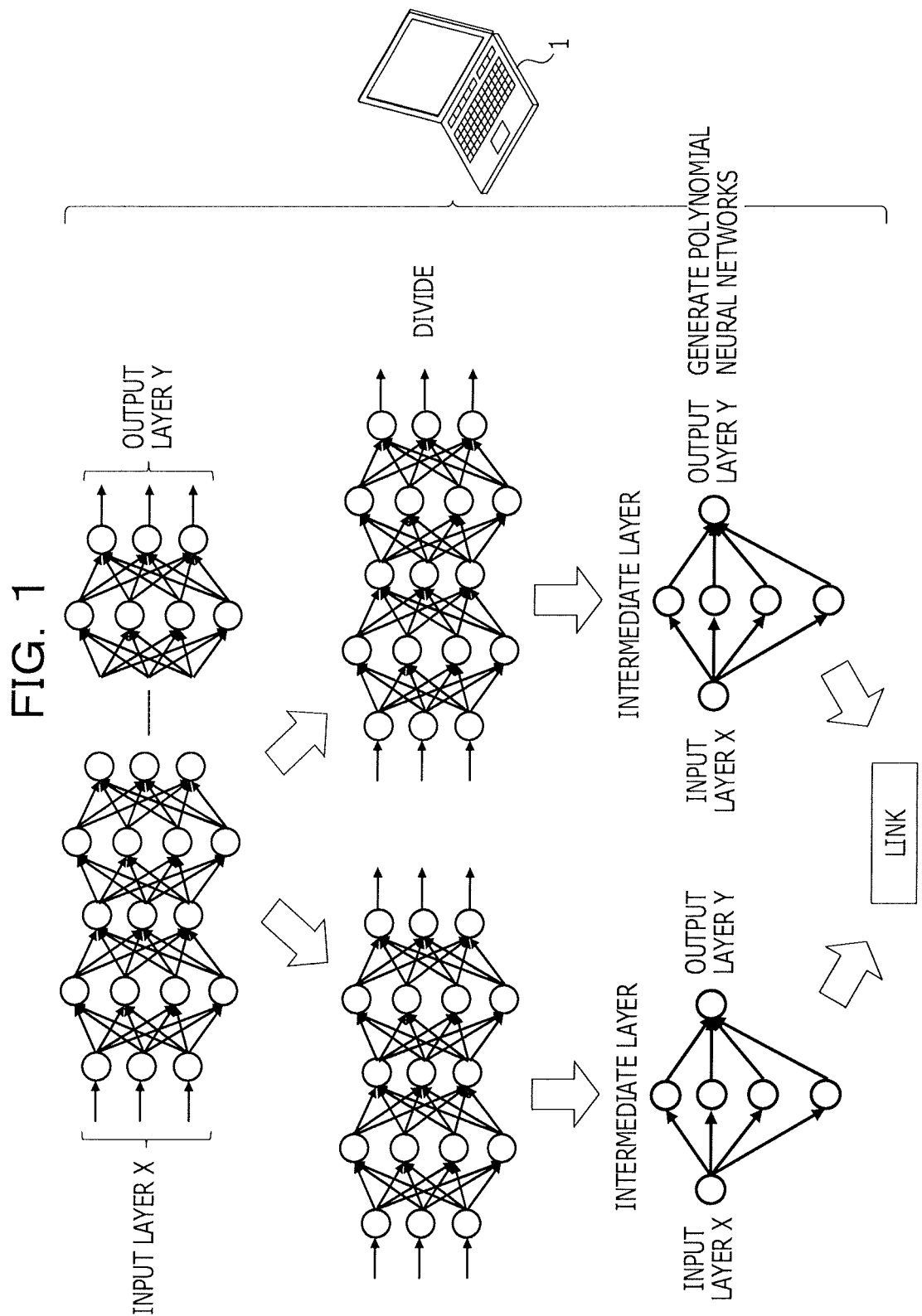
FIG. 1 is an explanatory diagram illustrating an outline of processing.

Hereinafter, embodiments will be described with reference to drawings. FIG. 1 is an explanatory diagram illustrating an outline of processing. An information processing device 1 is a server computer, a personal computer, a tablet, a smartphone, a mobile phone, or the like, for example. In what follows, the information processing device 1 will be replaced with a "computer 1" and be described. The computer 1 acquires a deep-layered neural network. The computer 1 divides the acquired neural network into neural networks. The computer 1 generates polynomial neural networks corresponding to the respective divided neural networks. Based on input-output characteristics obtained from the divided neural networks, the computer 1 performs learning processing on the polynomial neural networks, thereby identifying parameters. The computer 1 links the polynomial neural networks the parameters of which are identified. Hereinafter, details will be described.

Figure 2:
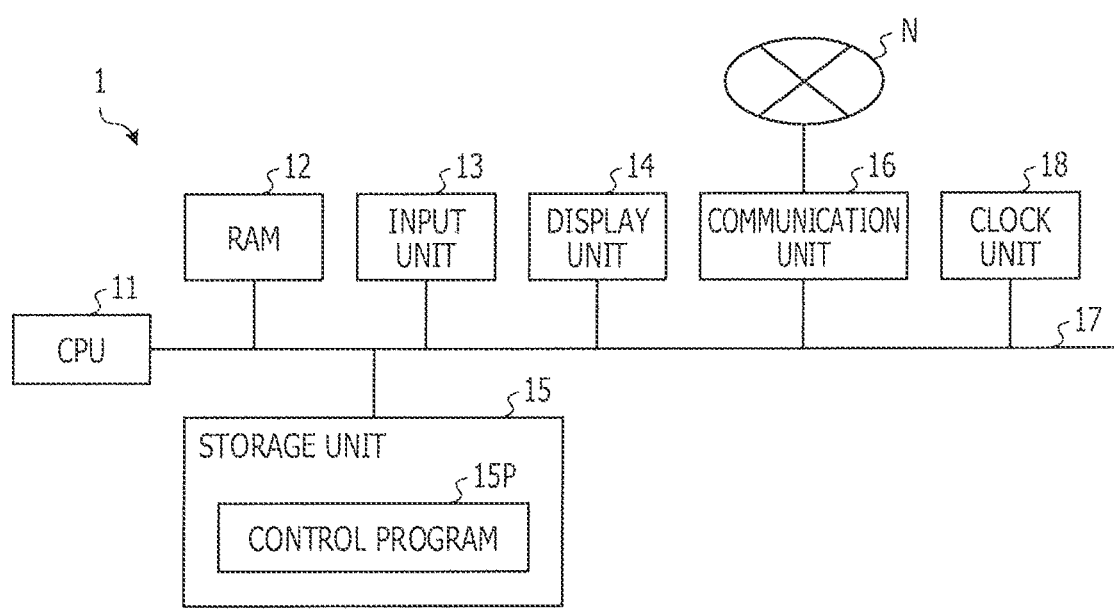
FIG. 2 is a block diagram illustrating a hardware configuration of a computer.

FIG. 2 is a block diagram illustrating a hardware configuration of the computer 1. The computer 1 includes a central processing unit (CPU) 11 to serve as a control unit, a random access memory (RAM) 12, an input unit 13, a display unit 14, a storage unit 15, a clock unit 18, a communication unit 16, and so forth. The CPU 11 is coupled to the individual hardware units via a bus 17. The CPU 11 controls the individual hardware units in accordance with a control program 15P stored in the storage unit 15. Note that the CPU 11 may be a multi-core processor equipped with processor cores. The RAM 12 is a static RAM (SRAM), a dynamic RAM (DRAM), a flash memory, or the like, for example. The RAM 12 further functions as a storage unit and temporarily stores therein various kinds of data generated at a time when the CPU 11 executes various programs.

The input unit 13 is an input device such as a mouse, keyboard, a touch panel, or a button and outputs received operation information to the CPU 11. The display unit 14 is a liquid crystal display, an organic electroluminescence (EL) display, or the like and displays various kinds of information in accordance with instructions of the CPU 11. The communication unit 16 is a communication module such as a router and transmits and receives pieces of information to and from another computer or the like not illustrated, via a communication network N as the Internet or a public line network. The clock unit 18 outputs time and date information to the CPU 11. The storage unit 15 is a large-capacity memory and stores therein the control program 15P and so forth.

Figure 3:
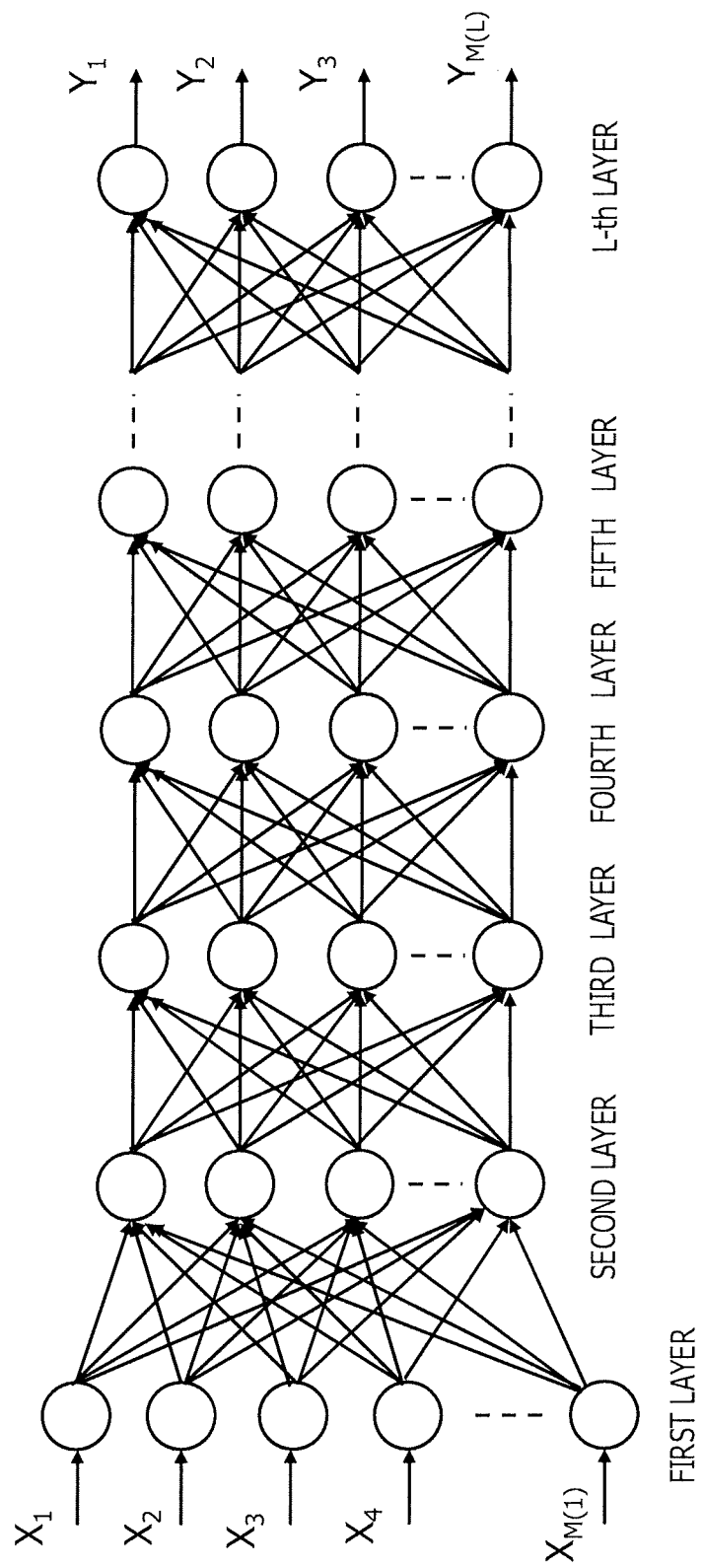
FIG. 3 is an explanatory diagram illustrating a deep-layered neural network.

FIG. 3 is an explanatory diagram illustrating a deep-layered neural network. In the neural network illustrated in FIG. 3, a first layer is an input layer, an L-th layer is an output layer, and intermediate layers exist between the input layer and the output layer. $X_1$ to $X_{M(1)}$ are individually input to the input layer. Regarding layers, as a whole, the first layer to the L-th layer exist including the intermediate layers (first layers). Note that the deep-layered neural network illustrated in the present embodiment is just an example and that there is no limitation to this. The deep-layered neural network only has to have at least four or more layers. $Y_1$ to $Y_{M(L)}$ are individually output by the output layer. In a case where an input is X and an output is Y, an input-output relationship of the deep-layered neural network may be expressed by the following Expression (1) and Expression (2).

$$X \equiv (x_l, \ldots x_{M(l)})^T \quad (1)$$

$$Y \equiv (y_l, \ldots y_{M(L)})^T = \sigma_L(W^{(L)}z_{L-1} + b_L) = \\ \sigma_L(W^{(L)}\sigma_{L-1}(W^{(L-1)}z_{L-2} + b_{L1}) + b_L) = \ldots z_l \equiv X \quad (2)$$

Here, "$W^{(i)}$" is a matrix, and "$b_i$" is a vector and is a weighting parameter. In addition, "σ" is an activation function, and "$z_l$" is an output of one of the intermediate layers (the first layers). The activation function σ may be expressed by the following Expression (3).

$$\sigma((v_l, \ldots, v_M)) \equiv (f(v_l), \ldots, f(v_M))$$

$$f(x) = \max\{x, 0\} \quad (3)$$

In the same way, an output of one of the intermediate layers (the first layers) is defined based on the following Expression (4). Here, the output of one of the first layers is equivalent to an M(I)-dimensional real-valued vector.

$$z_l = \sigma_l(W^{(l)}z_{l-1} + b_l) \quad (4)$$

In a case where the deep-layered neural network is implemented with hardware, elements to perform arithmetic operations of the intermediate layers are called intermediate elements. Usually, the intermediate elements are configured by addition circuits, multiplication circuits, memories, and so forth.

Since deep layering of a neural network significantly contributes to improvement of recognition performance, the deep layering of the neural network is further advanced. In a case where the number L of layers of the neural network is increased, the number of arithmetic operations is sequentially increased in proportion to the number L of layers. In this case, it becomes difficult to perform parallel arithmetic operations, and arithmetic processing performance is reduced. As illustrated in FIG. 3, in a case of obtaining an output result of "one of the first layers+one layer", an output result of the relevant first layer at a preceding stage has to be obtained. In a case of obtaining an output result of a final layer, calculations have to be sequentially performed starting from the first stage, and it is difficult to independently perform the calculation of each of the layers.

In a case where, in a three-layered neural network, the number of intermediate elements is infinite, in other words, it is possible to infinitely increase the dimension M(2) of an output of a second layer, it is possible to mathematically approximate an arbitrary function. Accordingly, even in a case of the three-layered neural network, it is conceivable that it is possible to realize the same function as that of the deep-layered neural network if the number of intermediate elements is infinite. Therefore, it is conceivable that the deep-layered neural network is approximated by the three-layered neural network and is subjected to parallel operations, thereby enhancing arithmetic processing performance.

Figure 4:
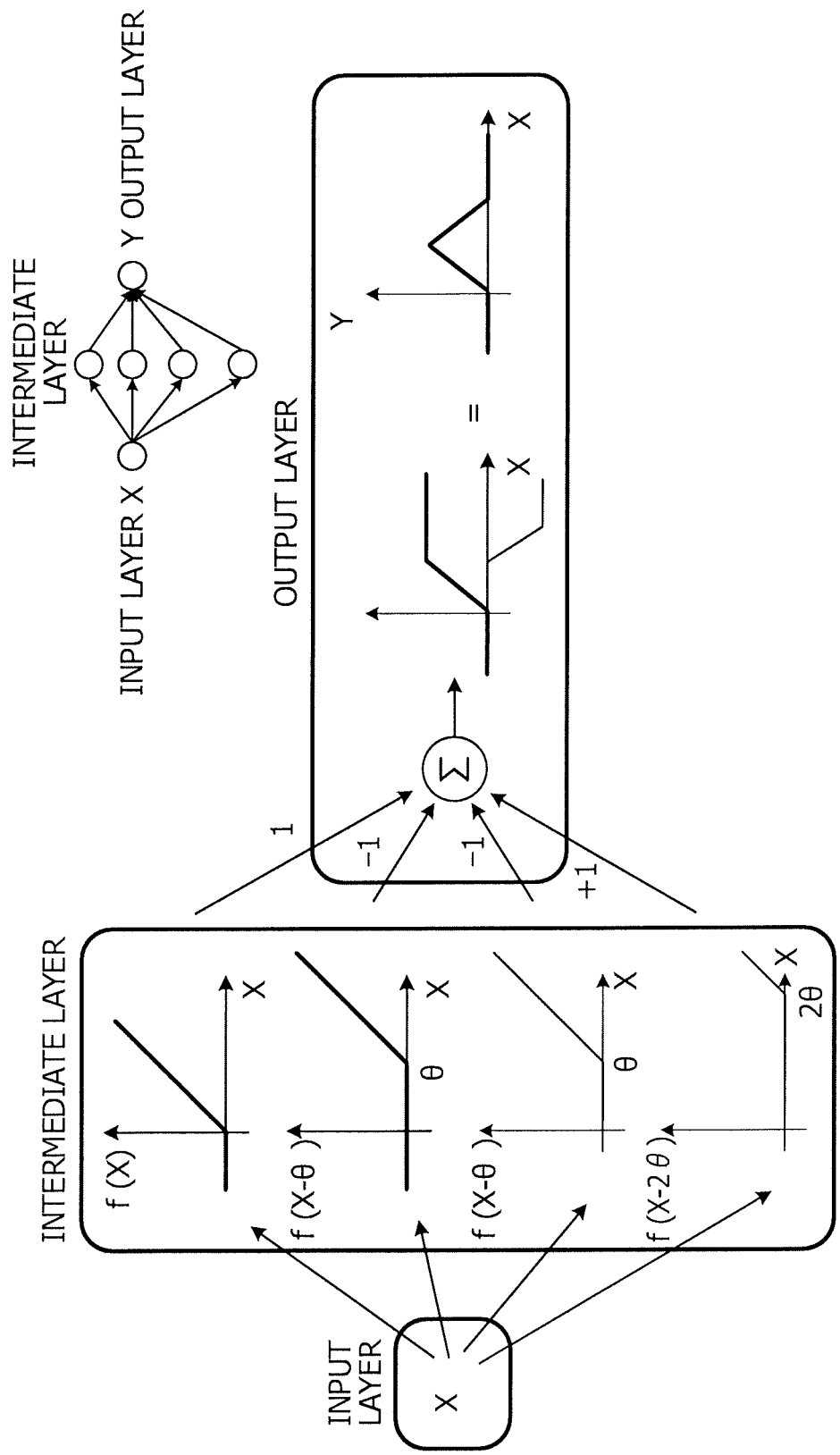
FIG. 4 is an explanatory diagram illustrating a concept of function approximation in a three-layered neural network.

FIG. 4 is an explanatory diagram illustrating a concept of function approximation in a three-layered neural network. FIG. 4 is an example in which a triangular waveform is created by using an activation function and displaced triangular waveforms are overlapped with each other, thereby approximating a function.

Figure 5:
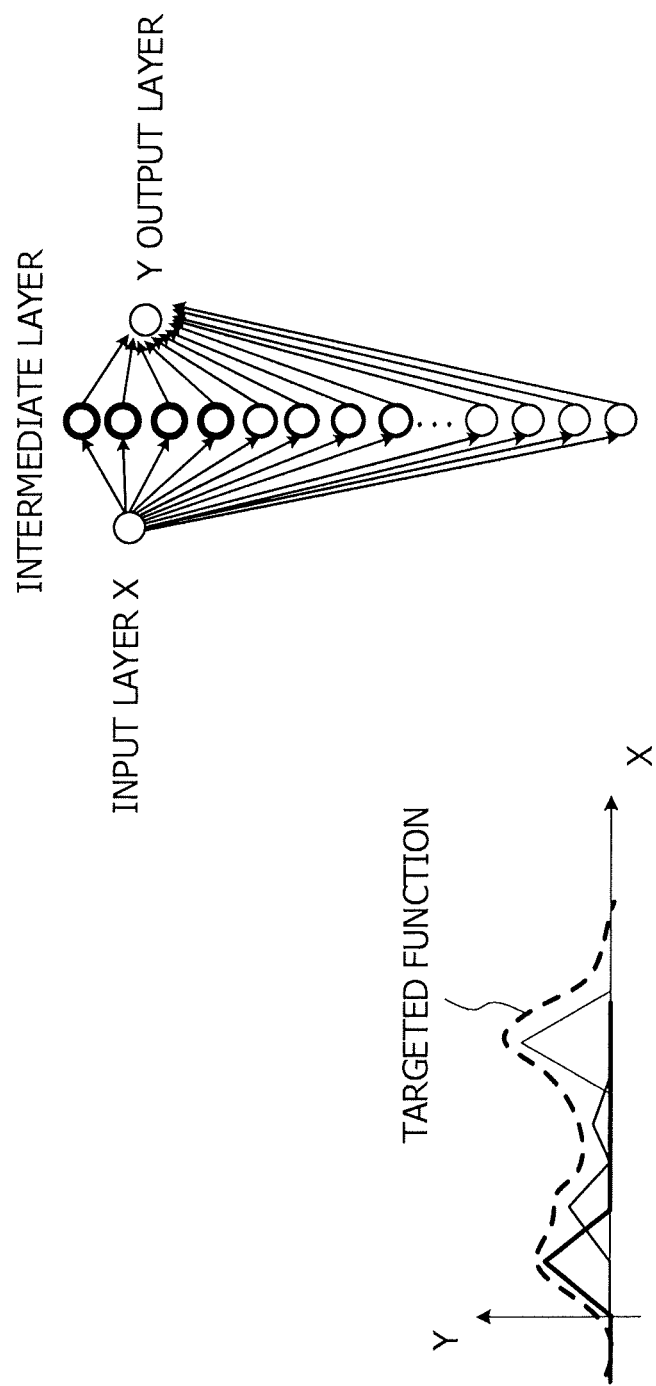
FIG. 5 is an explanatory diagram illustrating an example of a case where a targeted function smoothly changes little by little.
Figure 6:
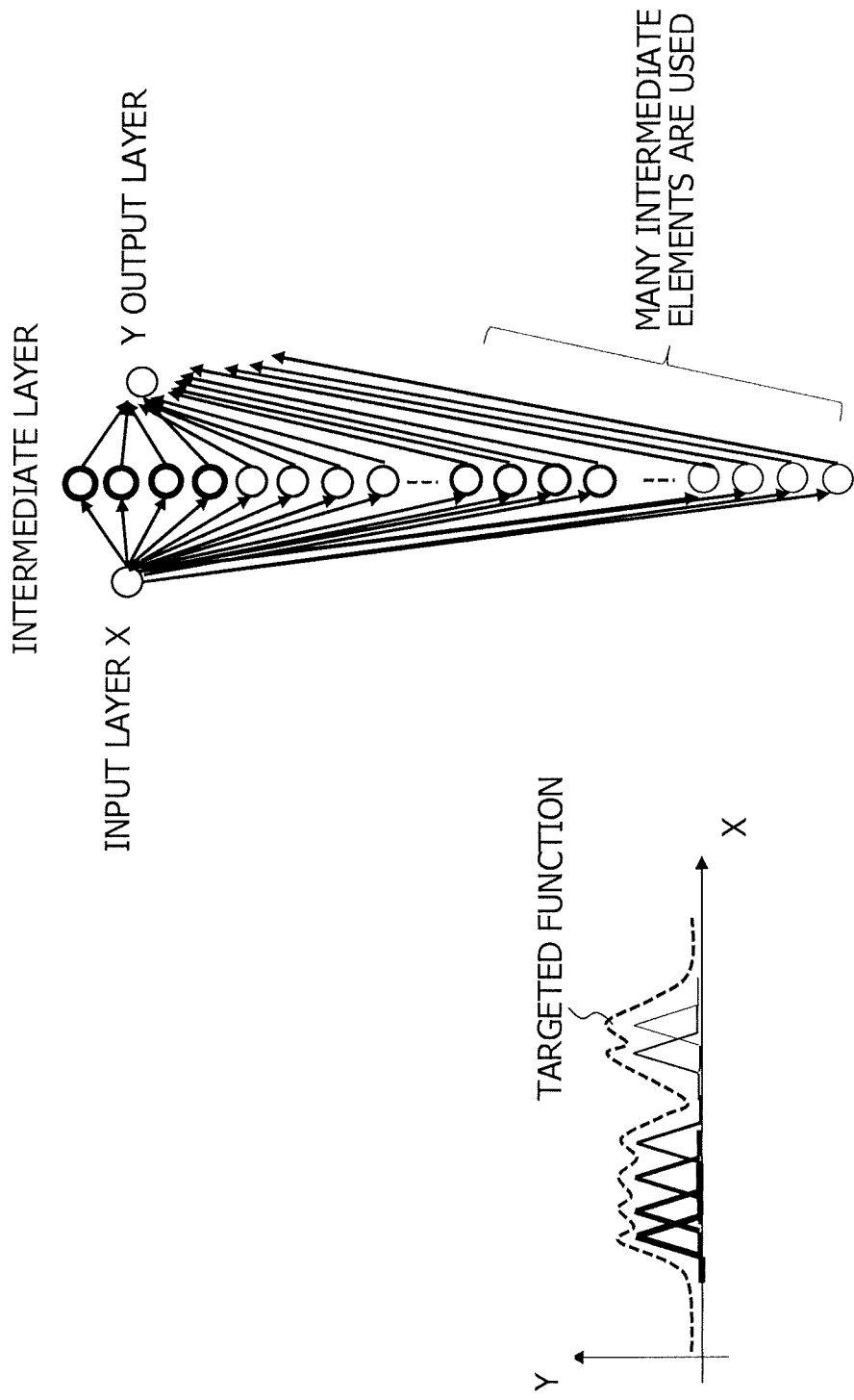
FIG. 6 is an explanatory diagram illustrating an example of a case where a targeted function smoothly changes little by little.

Each of FIG. 5 and FIG. 6 is an explanatory diagram illustrating an example of a case where a targeted function smoothly changes little by little. In order to represent the function illustrated in FIG. 5 or FIG. 6, many sharp triangular waveforms have to be used. In a case of creating one triangular waveform, at least two intermediate elements have to be used, and many intermediate elements have to be used as a result.

Figure 7:
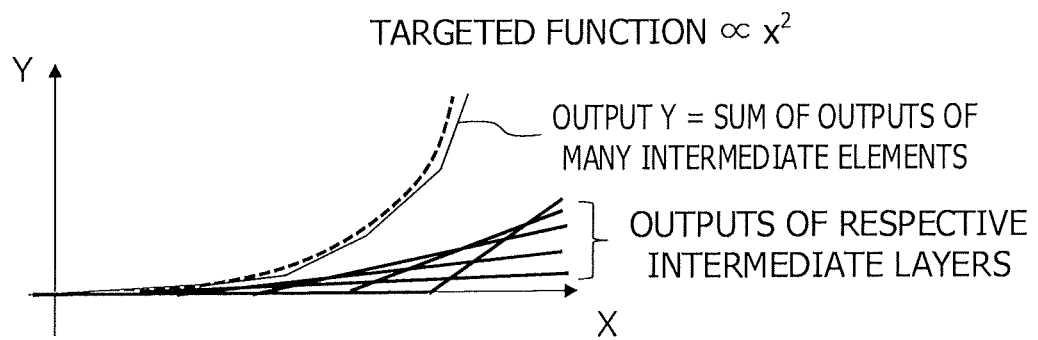
FIG. 7 is an explanatory diagram illustrating an example of a case where a targeted function is proportional to $x^2$.

FIG. 7 is an explanatory diagram illustrating an example of a case where a targeted function is proportional to $x^2$. In a case of FIG. 7, even though intermediate elements are increased by a large number, it is difficult to represent the targeted function. Accordingly, it is understood that, in a case where restrictions on hardware are tightened and it is difficult to prepare a sufficient number of intermediate elements, a method for approximating, by a three-layered neural net, a deep-layered neural net and performing parallel arithmetic operations thereon in order to enhance arithmetic processing performance of the deep-layered neural net is ineffective.

Figure 8:
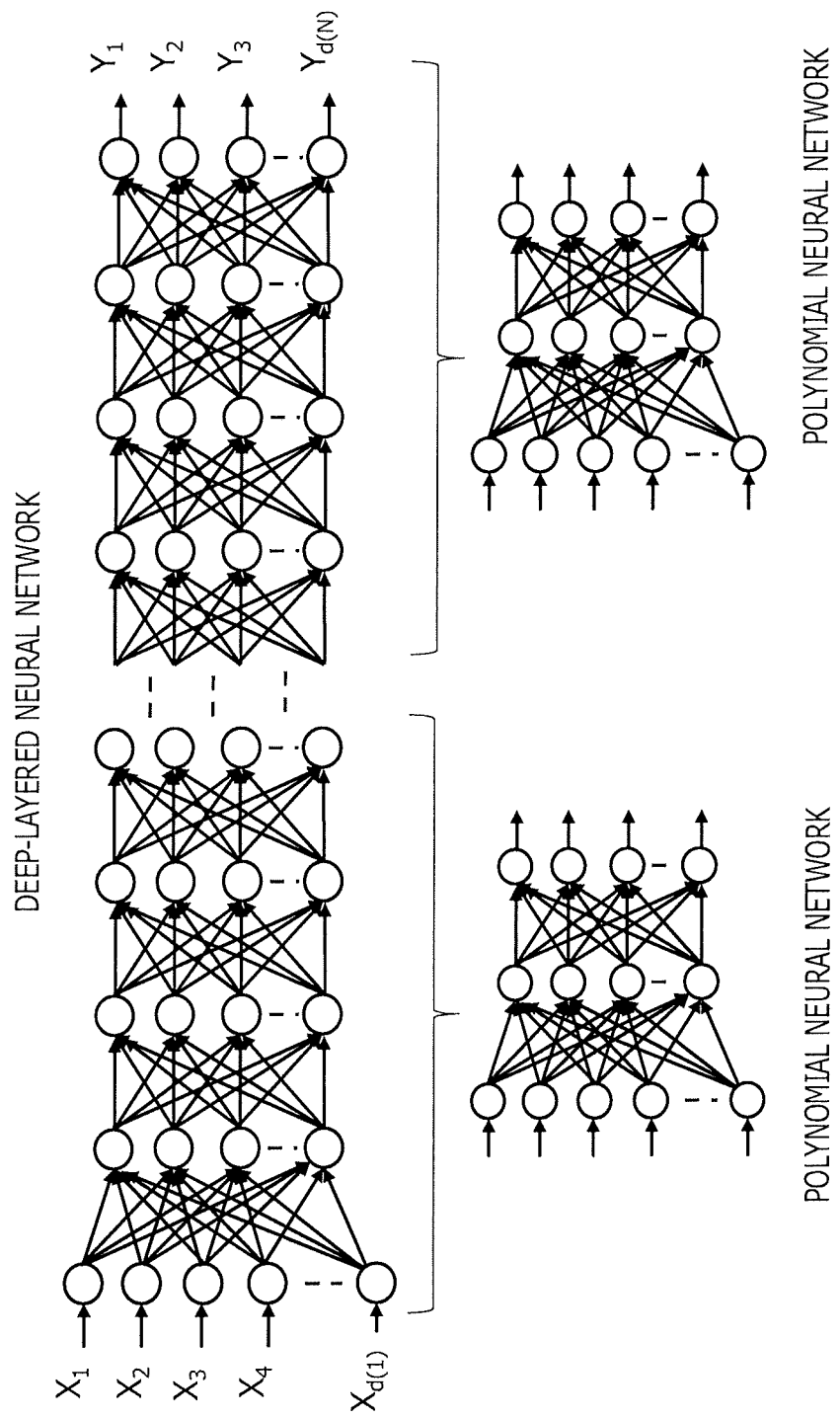
FIG. 8 is an explanatory diagram illustrating a deep-layered neural network and polynomial neural networks.

FIG. 8 is an explanatory diagram illustrating a deep-layered neural network and polynomial neural networks. The CPU 11 in the computer 1 divides a targeted deep-layered neural network into two parts at the center thereof, for example. The CPU 11 approximates each of the two divided neural networks by a three-layered polynomial neural network.

Figure 9:
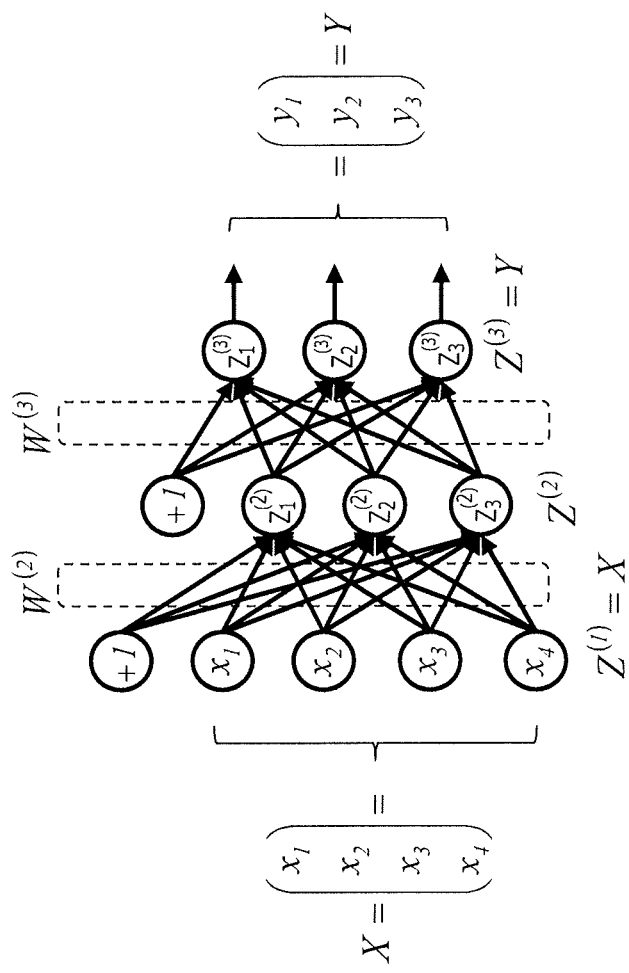
FIG. 9 is an explanatory diagram illustrating a configuration of a polynomial neural network and an output of an intermediate layer.

FIG. 9 is an explanatory diagram illustrating a configuration of a polynomial neural network and an output of an intermediate layer. An input and an output of the three-layered polynomial neural network may be expressed by the following Expression (5) and Expression (6).

$$X \equiv (x_l, \ldots x_{M(1)})^T \quad (5)$$

$$Y \equiv (y_l, \ldots y_{M(3)})^T$$

$$y_j \equiv w_0^{(3)} + \sum_i w_{j,i}^{(3)} z_i^{(2)}, \ 1 \le i \le M(2), \ 1 \le j \le M(3)$$

$$z_k^{(2)} = f\left(w_0^{(2)} + \sum_{a_1} w_{k,a_1}^{(2)} z_{a_1}^{(1)} + \sum_{a_1,a_2} w_{k,a_1,a_2}^{(2)} z_{a_1}^{(1)} z_{a_2}^{(1)} + \\ \ldots + \sum_{a_1,a_2,\ldots,a_d} w_{k,a_1,a_2,\ldots,a_d}^{(2)} z_{a_1}^{(1)} z_{a_2}^{(1)} \ldots z_{a_d}^{(1)}\right),$$

$$1 \le a_l \le M(1), \ 1 \le k \le M(2)$$

-continued $$(z_1^{(1)}, \ldots z_{M(1)}^{(1)})^T = X \quad (6)$$

Here, each "w" is a weighting parameter, and "f" is an activation function. "d" serving as one of parameters is the degree of the three-layered polynomial neural network. Note that usually the degree "d" is greater than or equal to two and details thereof well be described later.

Figure 11A:
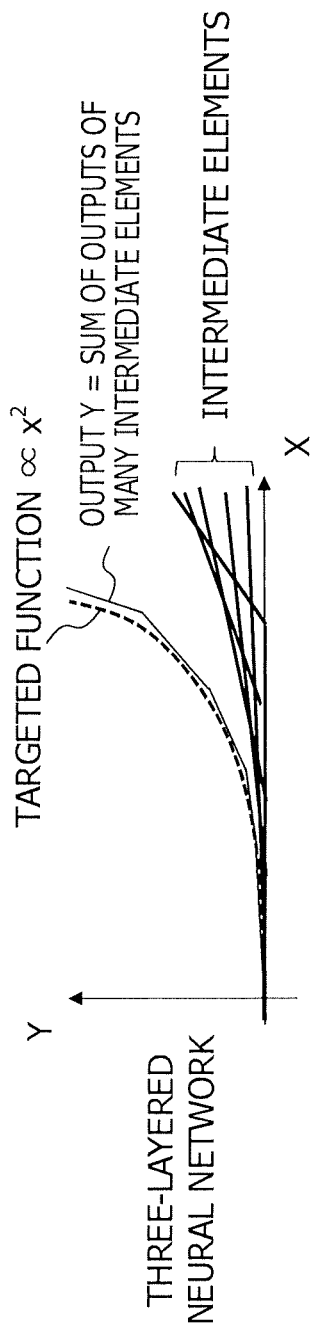
FIGS. 11A and 11B are explanatory diagrams for making a comparison between function approximation abilities.
Figure 11B:
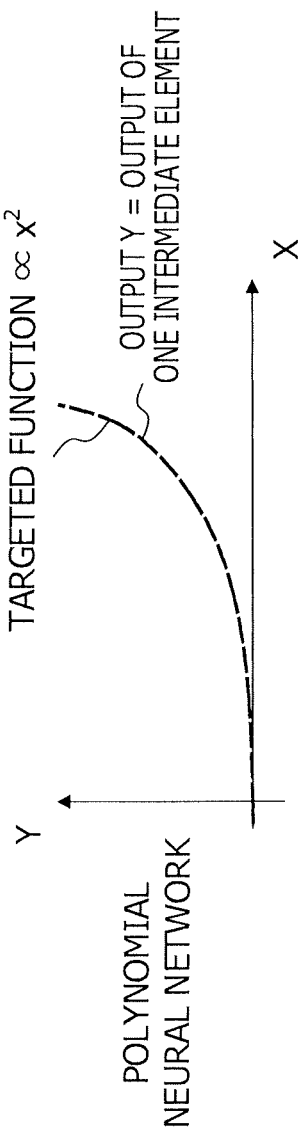

FIG. 10 is an explanatory diagram illustrating a concept of function approximation in a three-layered polynomial neural network. FIGS. 11A and 11B are explanatory diagrams for making a comparison between function approximation abilities. An example in which an impulse waveform is created by using an activation function and displaced impulse waveforms are overlapped with each other, thereby approximating a function, is illustrated. Impulse waveforms created in the three-layered neural network are only triangular waveforms. However, impulse waveforms created in the three-layered polynomial neural network include a waveform other than the triangular waveforms. Therefore, it may be said that the three-layered polynomial neural net has a function approximation ability higher than the three-layered neural network. As illustrated in FIG. 11A, in a case where a targeted function is a quadratic function, function approximation is performed in the three-layered neural network by using many intermediate elements. On the other hand, as illustrated in FIG. 11B, in the polynomial neural network, it is possible to perform function approximation with only one intermediate element, and the targeted function turns out to be adequately approximated by an output Y of one intermediate element. In this way, it is understood that the function approximation ability of the polynomial neural network is higher than that of the three-layered neural network.

Differently from the three-layered neural network, an arithmetic operation of the three-layered polynomial neural network includes an arithmetic operation of a multivariable polynomial the degree of which is greater than or equal to two. Therefore, in a case where the number of intermediate elements is an identical number, an arithmetic operation amount becomes greater than that of a three-layered neural network of the related art. However, since calculations of respective terms of the arithmetic operation of the multivariable polynomial are able to be independently performed, it is possible to perform parallel arithmetic operations. Accordingly, by performing parallel arithmetic operations, it is possible to enhance arithmetic processing performance, compared with the neural network. The number of multiplication circuits (=the number of times of multiplication) desired in a case where arithmetic processing operations of the multivariable polynomial are performed in parallel may be expressed by the following Expression (7).

$$M(2) \cdot (M(1) + M(1)^2 + \ldots + M(1)^d) \quad (7)$$

In addition, the number of addition circuits (=the number of times of addition) may be expressed by the following Expression (8).

$$M(2) \cdot (M(1) + M(1)^2 + \ldots + M(1)^d) \quad (8)$$

Here, "M(1)" is the dimension of input data, and "M(2)" is the number of intermediate elements (multiplication circuits and addition circuits). "d" is the degree of the three-layered polynomial neural network, and in a case of "d=1", the three-layered polynomial neural network becomes equal to the three-layered neural network. As is clear from Expression (7) and Expression (8), desired resources (multiplication circuits and addition circuits) of hardware are decreased with a decrease in the degree and are decreased with a decrease in the number M(2) of intermediate elements. However, in a case where the degree d and the number M(2) of intermediate elements are excessively decreased, the function approximation ability of the polynomial neural network is reduced. Therefore, it is difficult to simply decrease the degree d and the number M(2) of intermediate elements. Therefore, in a case where a restriction is imposed on resources (multiplication circuits and addition circuits) of hardware, the degree d and the number M(2) of intermediate elements are adjusted to lower levels so that the function approximation ability of the polynomial neural network is not excessively reduced.

Figure 12:
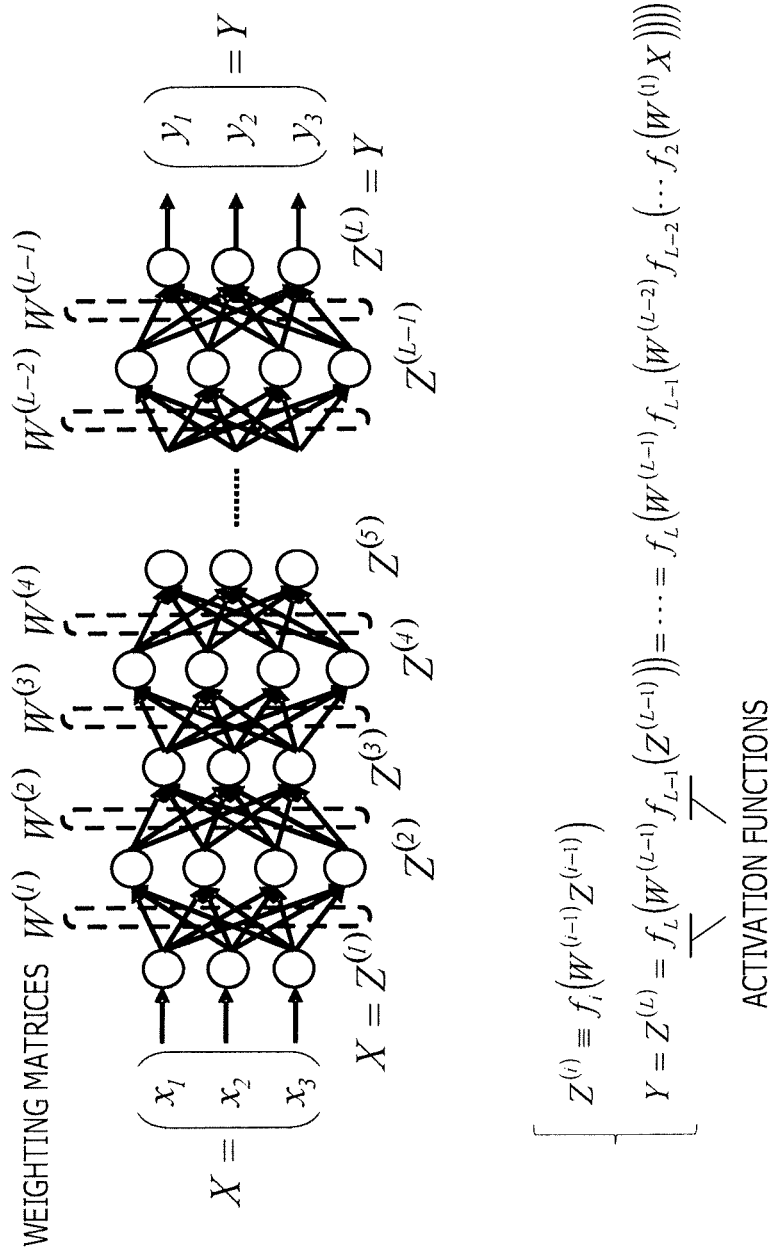
FIG. 12 is an explanatory diagram illustrating a deep-layered neural network.

FIG. 12 is an explanatory diagram illustrating a deep-layered neural network. In the embodiment, a description will be provided while assuming that the number of layers is greater than three. The CPU 11 reads, from the storage unit 15, a targeted deep-layered neural network and input data used at a time of learning of the relevant deep-layered neural network. The CPU 11 inputs the read pieces of input data $x_1$ to $x_3$, to the targeted deep-layered neural network. The CPU 11 acquires output data $Y=Z^{(l)}$ of the output layer of the deep-layered neural network and output data $Z^{(l)}$ of each of intermediate layers. "$W^{(1)}$" to "$W^{(L-1)}$" are weighting matrices between individual layers.

Here, the output data of one of the intermediate layers may be expressed by the following Expression (9), and the output data Y of the output layer may be expressed by the following Expression (10). Note that "$f_L$" and "$f_{L=1}$" are activation functions. The CPU 11 stores, in the RAM 12, the pieces of input data, the calculated pieces of output data of the respective intermediate layers, and the calculated output data of the output layer.

$$Z^{(i)} = f_i(W^{(i-1)}Z^{(i-1)}) \quad (9)$$

$$Y = Z^{(L)} = f_L(W^{(L-1)}f_{L-1}(Z^{(L-1)})) = \ldots = f_L(W^{(L-1)}f_{L-1}(W^{(L-2)}f_{L-2}(\ldots f_2(W^{(l)}X)))) \quad (10)$$

Figure 13:
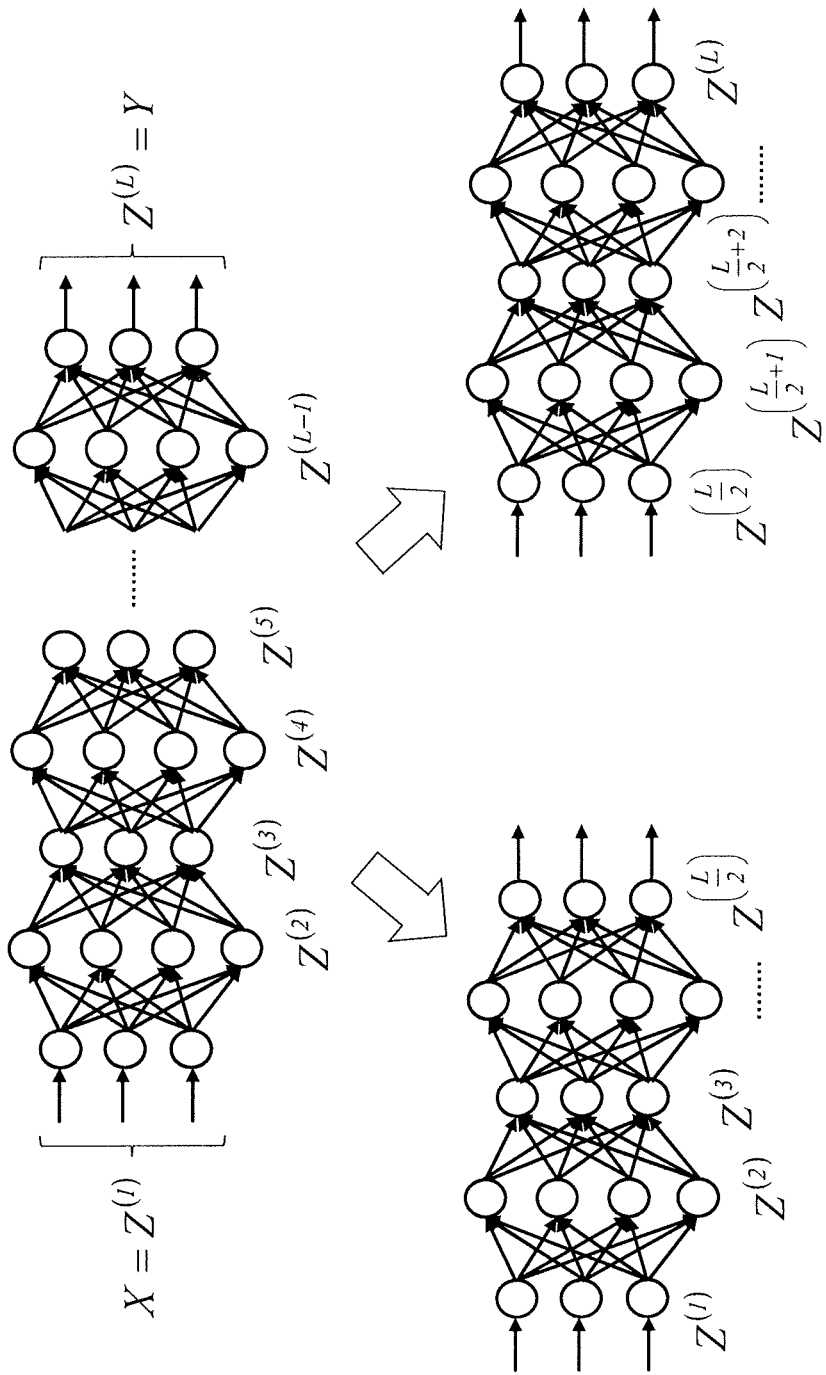
FIG. 13 is an explanatory diagram illustrating a divided state.

Next, the CPU 11 performs division processing of the deep-layered neural network. FIG. 13 is an explanatory diagram illustrating a divided state. In a case where the deep-layered neural network has L layers (L>3), the CPU 11 divides into two parts of a neural network having a first layer to an L/2-th layer and a neural network having the L/2-th layer to an L-th layer, thereby generating two deep-layered neural networks. Note that while an example of dividing into two parts is illustrated in the embodiment, there is no limitation to this. Dividing into three parts or dividing into four parts may be adopted. In addition, a division number may be changed in accordance with the number of layers. In a case where the number of layers exceeds a first threshold value (100), the CPU 11 may switch from dividing into two parts to dividing into four parts, and in a case where the number of layers exceeds a second threshold value (200), the CPU 11 may switch from dividing into four parts to dividing into eight parts, for example.

In the example of FIG. 13, dividing into a first deep-layered neural network of $Z^1$ to $Z^{(L/2)}$ and a second deep-layered neural network of $Z^{(L/2)}$ to $Z^{(L)}$ is adopted. Next, the CPU 11 acquires input and output data of each of the neural networks. In the present embodiment, the CPU 11 acquires first learning data for the first deep-layered neural network and second learning data for the second deep-layered neural network. Input data of the first learning data is data input to the first layer, and output data of the first learning data is data output from the L/2-th layer. The CPU 11 acquires and stores the first learning data from the RAM 12 and in the RAM 12. Input data of the second learning data is data output from the L/2-th layer, and output data of the second learning data is data output from the L-th layer. The CPU 11 acquires and stores the second learning data from the RAM 12 and in the RAM 12.

In Expression (7) to Expression (10), the CPU 11 sets initial values of weighting parameters, an initial value (one or two, for example) of the degree d of a polynomial expression, and an initial value (one or two, for example) of the number of intermediate elements. Based on the settings of the initial values, the CPU 11 generates a first polynomial neural network corresponding to the first deep-layered neural network and a second polynomial neural network corresponding to the second deep-layered neural network. Based on the first learning data, the CPU 11 causes the first polynomial neural network to be subjected to learning. In the same way, based on the second learning data, the CPU 11 causes the second polynomial neural network to be subjected to learning. In other words, through learning, weighting parameters serving as parameters, a degree, and the number of intermediate elements are identified.

At a time of performing learning processing, the CPU 11 uses a gradient method. Note that the gradient method is just an example and another method may be adopted. A simulated annealing (SA) method or a genetic algorithm method may be used, for example. As a loss function $E(X, W^{(2)}, W^{(3)})$ that is based on the gradient method and that serves as a correspondence value corresponding to a polynomial neural network, a square loss illustrated by the following Expression (11) is used.

$$E(W^{(2)}, W^{(3)}) \equiv \frac{1}{2} \sum_{n=1}^{N} \sum_{j=1}^{M(3)} (y_j(X_n) - d_j)^2 \quad (11)$$

$$W^{(2)} \equiv (w_{1,1}^{(2)}, w_{2,1}^{(2)}, w_{1,2}^{(2)}, \ldots, w_{M(2),M(1),\ldots,M(1)}^{(2)})$$

$$W^{(3)} \equiv (w_{1,1}^{(3)}, w_{2,1}^{(3)}, w_{1,2}^{(3)}, \ldots, w_{M(3),M(2)}^{(3)})$$

Here, $X_n$ (n=1, 2, ...) is input data of learning data, $y_j$ is output data of the learning data, $W^{(2)}$ and $W^{(3)}$ are weighting parameters included in the three-layered polynomial neural network. In the CPU 11, the gradients of $E(W^{(2)}, W^{(3)})$ of the loss function are expressed by the following Expression (12), for example.

$$\frac{\partial E}{\partial w_{j,i}^{(3)}} = \sum_{n=1}^{N} (y_i(X_n) - d_j) \cdot z_i^{(2)}(X_n) \quad (12)$$

$$\frac{\partial E}{\partial w_{j,a_1,\ldots a_k}^{(2)}} = \sum_{n=1}^{N} \sum_{m=1}^{M(3)} (y_m(X_n) - d_m) f'(u_j^{(2)}) z_{a_1}^{(2)}(X_n) \ldots z_{a_k}^{(2)}(X_n) \cdot w_{m,j}^{(3)}$$

$$1 \leq k \leq d, 1 \leq j \leq M(3)$$

Based on the calculated gradients, the CPU 11 updates weighting parameters. Updates of the weighting parameters are calculated based on the following Expression (13), for example.

$$W^{(2)} \leftarrow W^{(2)} - \alpha \cdot \frac{\partial E}{\partial W^{(2)}} \quad (13)$$

-continued $$W^{(3)} \leftarrow W^{(3)} - \alpha \cdot \frac{\partial E}{\partial W^{(3)}}$$

As a result of the learning, the CPU 11 determines whether or not a value of the loss function $E(W^{(2)}, W^{(3)})$ is greater than a threshold value stored in the storage unit 15. In a case where the value of the loss function is greater than the threshold value, the CPU 11 changes the degree d of the polynomial neural network and the number M(2) of intermediate elements, based on the following Expression (14).

$$d \leftarrow d+1$$

$$M(2) \leftarrow M_{max}/(M(1) + M(1)^2 + \ldots + M(1)^d) \quad (14)$$

Here, "$M_{max}$" is the upper limit number of intermediate elements. Note that, as the upper limit number of intermediate elements, an arbitrarily value may be set by the input unit 13. The CPU 11 performs the above-mentioned processing on both the first polynomial neural network and the second polynomial neural network. In a case where the loss function is not greater than the threshold value, the CPU 11 stores, in the RAM 12, the first polynomial neural network and the second polynomial neural network that each have weighting parameters, a degree, and the number of intermediate elements, finally defined. The CPU 11 links the output layer of the first polynomial neural network and the input layer of the second polynomial neural network with each other. The CPU 11 outputs the linked polynomial neural networks to the display unit 14 or outputs the linked polynomial neural networks to another computer (not illustrated) via the communication unit 16.

Figure 14:
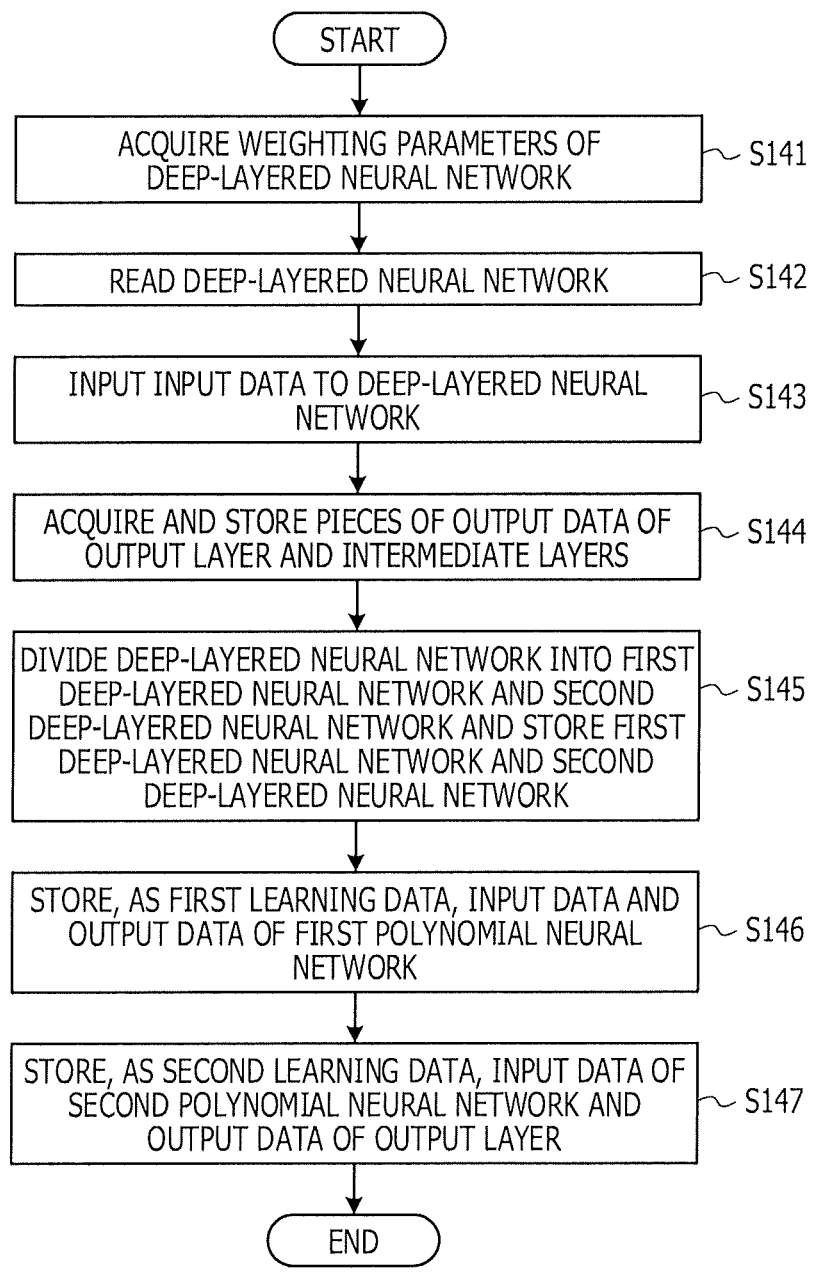
FIG. 14 is a flowchart illustrating a procedure of division processing.

Software processing in the above-mentioned hardware group will be described by using a flowchart. FIG. 14 is a flowchart illustrating a procedure of division processing. The CPU 11 in the computer 1 acquires, from the input unit 13 or the storage unit 15, already learned weighting parameters of a deep-layered neural network (step S141). The CPU 11 reads, from the storage unit 15, a deep-layered neural network serving as a target (step S142). The CPU 11 inputs input data for learning to the deep-layered neural network (step S143). The CPU 11 acquires pieces of output data of an output layer and intermediate layers and stores these in the RAM 12 (step S144).

The CPU 11 divides the deep-layered neural network into the first deep-layered neural network and the second deep-layered neural network and stores the divided first deep-layered neural network and second deep-layered neural network in the RAM 12 (step S145). The CPU 11 stores, in the RAM 12, the input data and output data of the first polynomial neural network as the first learning data (step S146). The CPU 11 stores, in the RAM 12, input data of the second polynomial neural network and the output data of the output layer as the second learning data (step S147).

Figure 15:
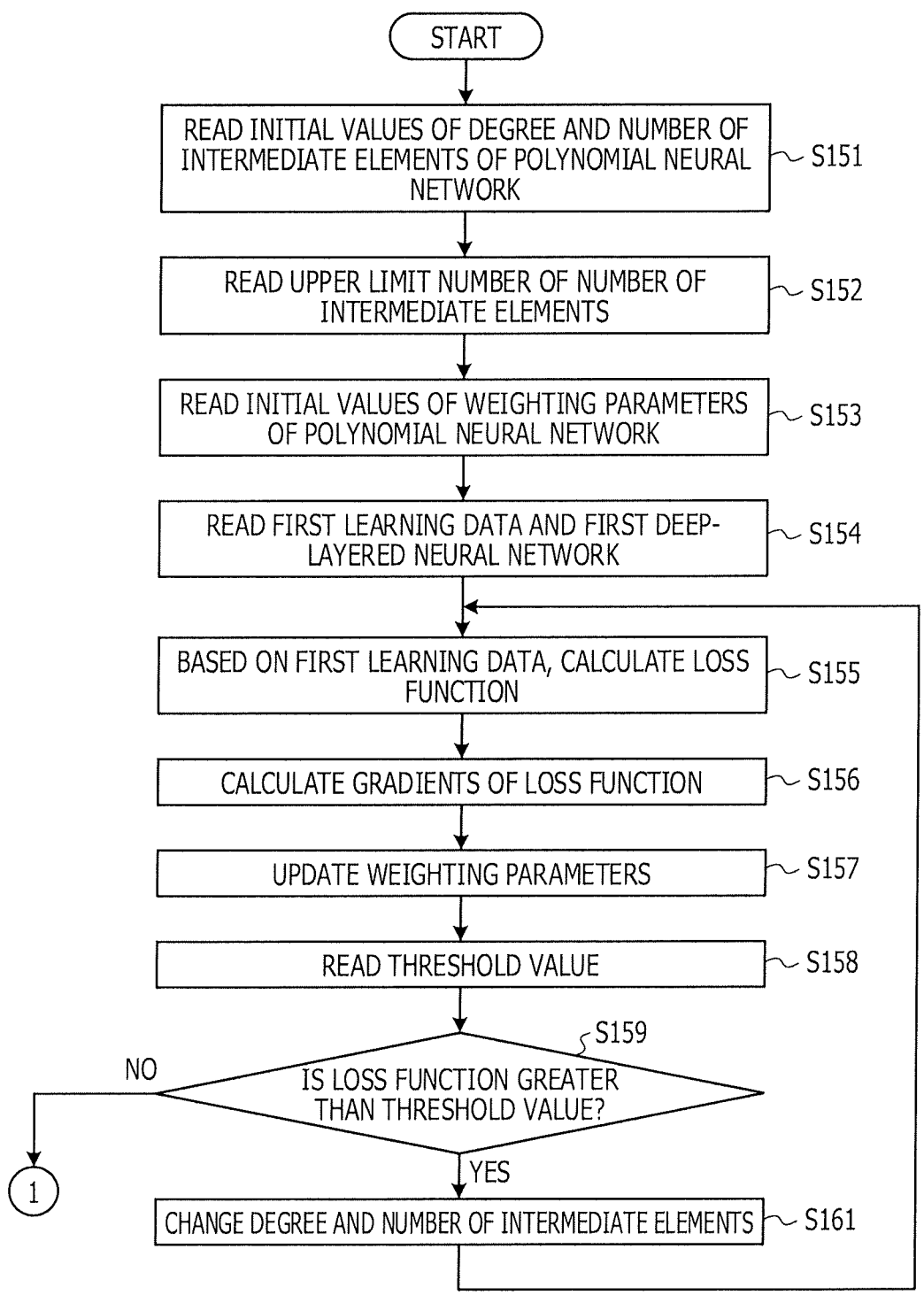
FIG. 15 is a flowchart illustrating a procedure of learning processing.
Figure 16:
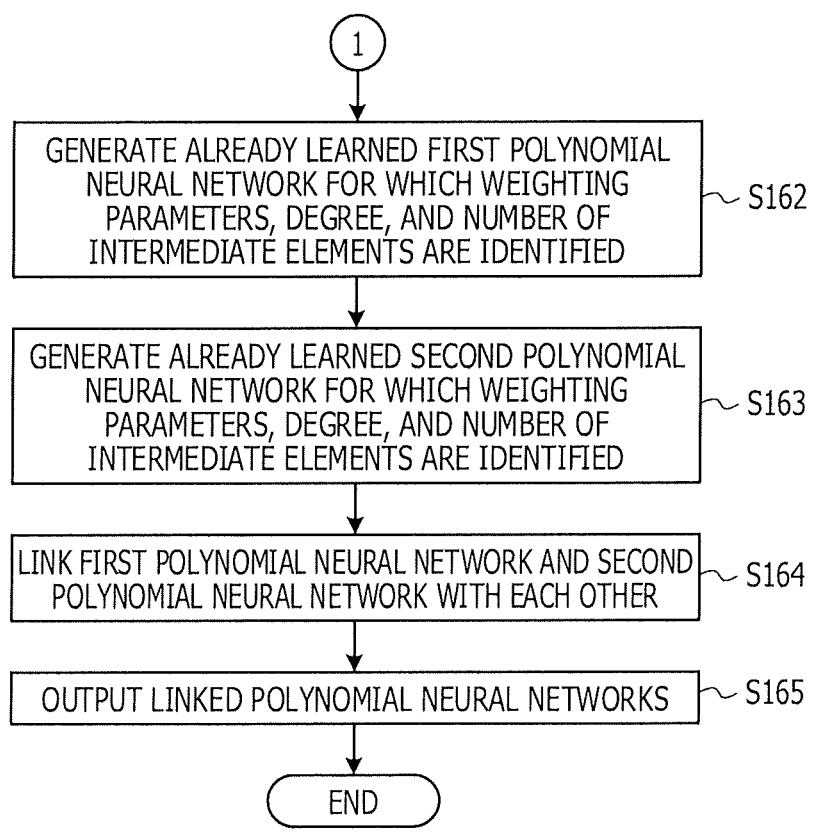
FIG. 16 is a flowchart illustrating a procedure of the learning processing.

Each of FIG. 15 and FIG. 16 is a flowchart illustrating a procedure of learning processing. The CPU 11 reads, from the storage unit 15, initial values of a degree and the number of intermediate elements of a polynomial neural network (step S151). The CPU 11 reads, from the storage unit 15, a preliminarily set upper limit of the number of intermediate elements (step S152). The CPU 11 reads initial values of weighting parameters of the polynomial neural network (step S153). The CPU 11 reads the first learning data and the first deep-layered neural network that are stored in the RAM 12 (step S154).

Based on Expression (5) to Expression (11) and the first learning data, the CPU 11 performs learning processing of the first polynomial neural network. Specifically, based on the first learning data, the CPU 11 calculates a loss function of the first polynomial neural network (step S155). The CPU 11 calculates gradients of the calculated loss function, based on Expression (12) (step S156). Based on the calculated gradients of the loss function and Expression (13), the CPU 11 updates the weighting parameters (step S157). The CPU 11 stores the updated weighting parameters in the RAM 12.

The CPU 11 reads a threshold value from the storage unit 15 (step S158). The CPU 11 determines whether or not the calculated loss function is greater than the threshold value (step S159). In a case where it is determined that the loss function is greater than the threshold value (step S159: YES), the CPU 11 shifts the processing to step S161. Based on Expression (14) to which the upper limit number of intermediate elements is input, the CPU 11 changes the degree and the number of intermediate elements (step S161). The CPU 11 stores, in the RAM 12, the changed degree and the changed number of intermediate elements.

After that, the CPU 11 returns the processing to step S155. By repeating the above-mentioned processing, the learning progresses, thereby causing the loss function to be less than the threshold value. In a case where it is determined that the loss function is not greater than the threshold value (step S159: NO), the CPU 11 shifts the processing to step S162. The CPU 11 reads the already updated weighting parameters, the changed degree, and the changed number of intermediate element that are stored in the RAM 12. The CPU 11 generates the already learned first polynomial neural network for which the weighting parameters, the degree, and the number of intermediate elements that are read are identified (step S162).

By using the second learning data, the CPU 11 performs the processing operations in steps S154 to S162 in the same way, thereby performing learning processing of the second polynomial neural network. The CPU 11 generates the second polynomial neural network for which the weighting parameters, the degree, and the number of intermediate elements are finally identified (step S163). The CPU 11 links the generated first polynomial neural network and second polynomial neural network with each other (step S164). The CPU 11 outputs the linked polynomial neural networks to the display unit 14 (step S165). For this reason, it becomes possible to accelerate the speed of arithmetic processing. In addition, it becomes possible to perform the arithmetic processing within a constraint on the number of intermediate elements.

Second Embodiment

Figure 17:
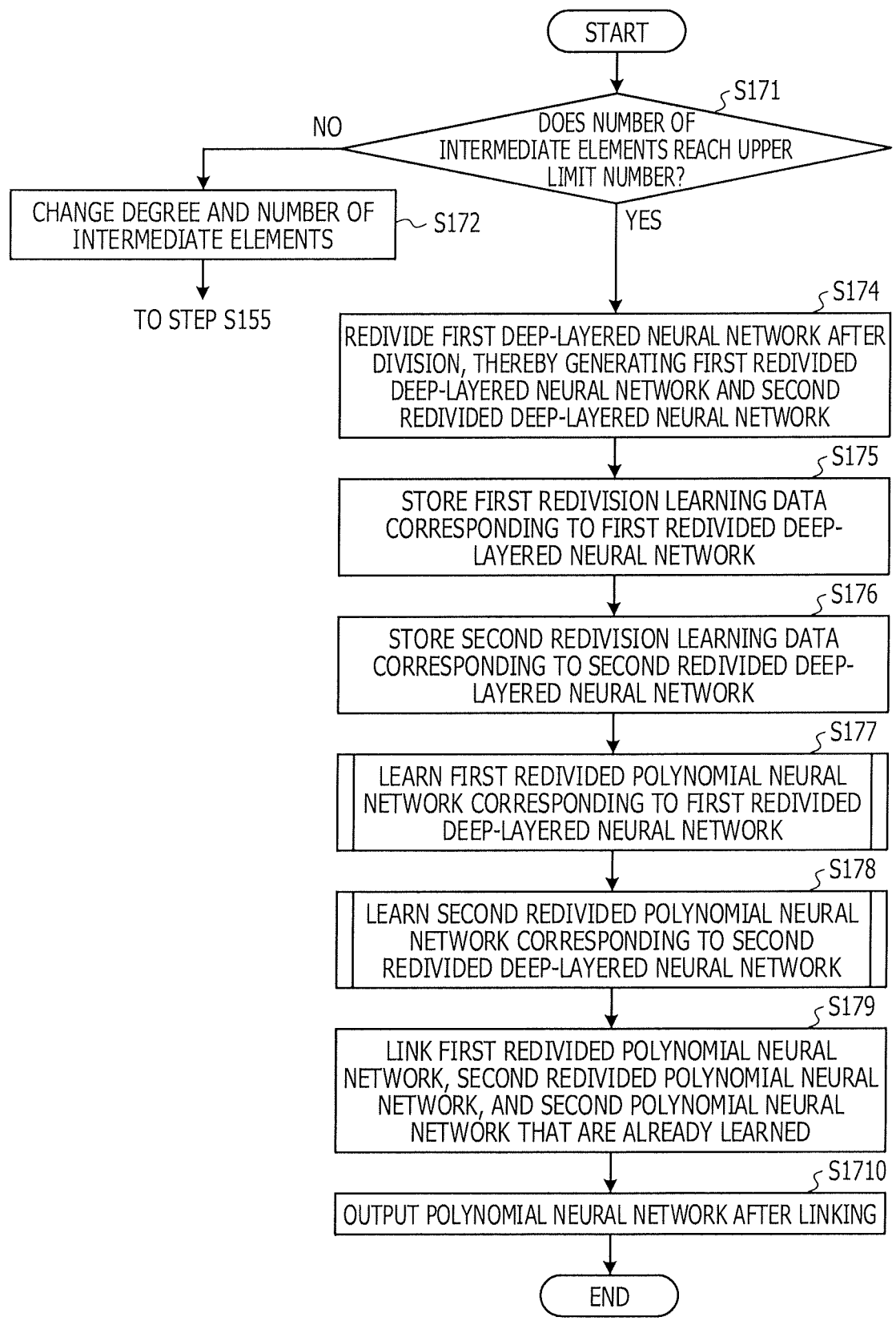
FIG. 17 is a flowchart illustrating a procedure of redivision processing.

A second embodiment is related to an embodiment of redividing. FIG. 17 is a flowchart illustrating a procedure of redivision processing. After "YES" in step S159, in other words, in a case where the loss function is greater than the threshold value, the CPU 11 in the computer 1 determines whether or not the number of intermediate elements reaches the upper limit number (step S171). In a case where the number of intermediate elements does not reach the upper limit number (step S171: NO), the CPU 11 shifts the processing to step S172. As described in the first embodiment, the CPU 11 changes the degree and the number of intermediate elements (step S172). After that, the CPU 11 shifts the processing to step S155 described in the first embodiment.

In a case where it is determined that the number of intermediate elements reaches the upper limit number (step S171: YES), the CPU 11 shifts the processing to step S174.

In the present embodiment, an example in which the loss function is greater than the threshold value even though the number of intermediate elements on a first deep-layered neural network side reaches the upper limit number will be cited and described. The CPU 11 redivides the first deep-layered neural network after division, thereby generating a first redivided deep-layered neural network and a second redivided deep-layered neural network (step S174).

Figure 18:
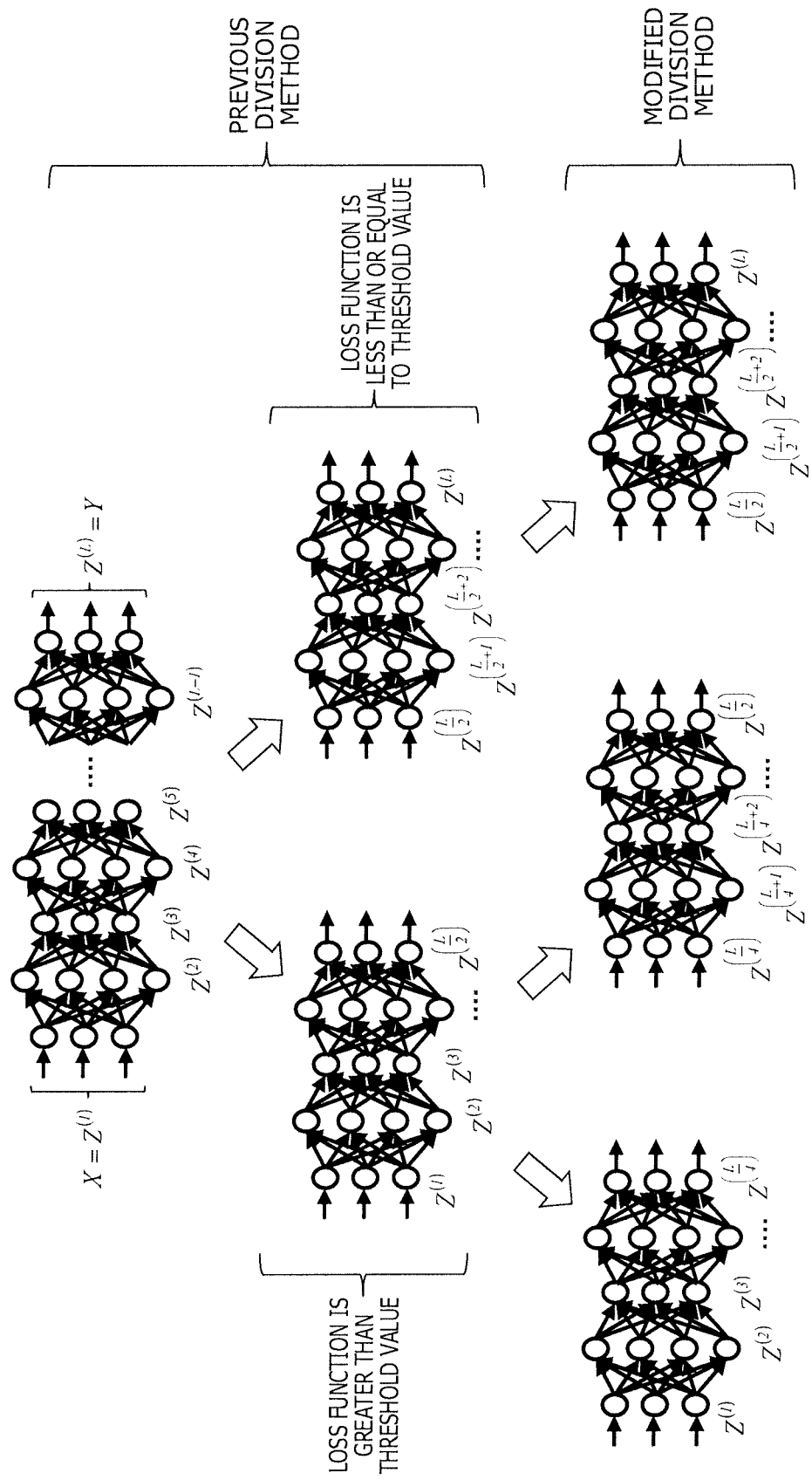
FIG. 18 is an explanatory diagram illustrating the redivision processing.

FIG. 18 is an explanatory diagram illustrating the redivision processing. As illustrated in FIG. 18, a description will be provided while assuming that the loss function of the first deep-layered neural network of $Z^{(1)}$ to $Z^{(L/2)}$ is greater than the threshold value. In this case, the CPU 11 redivides the first deep-layered neural network into two parts with $Z^{(L/4)}$ as a boundary. Note that the example of division is just an example and dividing into three or more parts may be adopted. On the other hand, since the loss function of the second deep-layered neural network is less than or equal to the threshold value, the learning processing of the second polynomial neural network is completed based on the processing described in the first embodiment.

The first deep-layered neural network is divided into two parts of the first redivided deep-layered neural network of $Z^{(1)}$ to $Z^{(L/4)}$ and the second redivided deep-layered neural network of $Z^{(L/4)}$ to $Z^{(L/2)}$. The CPU 11 stores, in the RAM 12, first redivision learning data corresponding to the first redivided deep-layered neural network (step S175). Specifically, input data is $Z^{(1)}$, and output data is $Z^{(L/4)}$. In the same way, the CPU 11 stores, in the RAM 12, second redivision learning data corresponding to the second redivided deep-layered neural network (step S176). Specifically, input data is $Z^{(L/4)}$, and output data is $Z^{(L/2)}$.

Based on the processing operations in steps S154 to S162 described in the first embodiment, the CPU 11 learns a first redivided polynomial neural network corresponding to the first redivided deep-layered neural network, by using the first redivision learning data (step S177). In the same way, the CPU 11 learns a second redivided polynomial neural network corresponding to the second redivided deep-layered neural network, by using the second redivision learning data (step S178).

The CPU 11 links the first redivided polynomial neural network, the second redivided polynomial neural network, and the second polynomial neural network that are already learned (step S179). The CPU 11 outputs, to the display unit 14, a polynomial neural network after the linking (step S1710). For this reason, even in a case where the upper limit number of the number of intermediate elements is insufficient, redivision is performed, thereby enabling the polynomial neural networks to be subjected to adequate learning.

The present second embodiment is as described above, and the other portions thereof are the same as those of the first embodiment. Therefore, the same reference number is assigned to a corresponding portion, and details thereof will be omitted.

Third Embodiment

Figure 19:
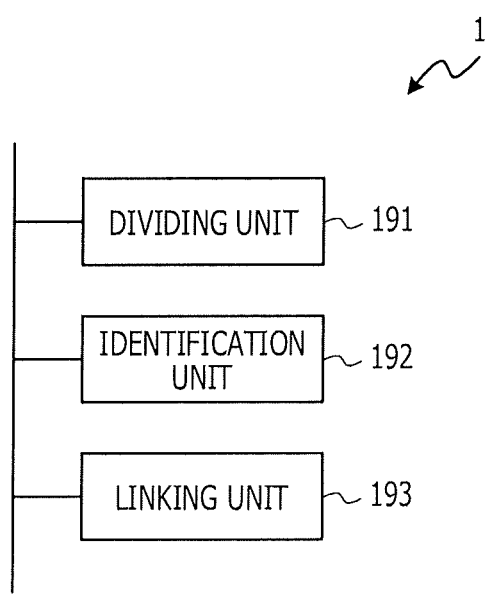
FIG. 19 is a functional block diagram illustrating an operation of the computer of the above-mentioned embodiment.

FIG. 19 is a functional block diagram illustrating an operation of the computer 1 of the above-mentioned embodiments. The CPU 11 executes the control program 15P, thereby causing the computer 1 to operate as follows. A dividing unit 191 divides a neural network into neural networks. Based on input-output characteristics of the respective divided neural networks, an identification unit 192 identifies parameters of each of polynomial neural networks corresponding to the respective divided neural networks. A linking unit 193 links the individual polynomial neural networks after the identification with each other.

Figure 20:
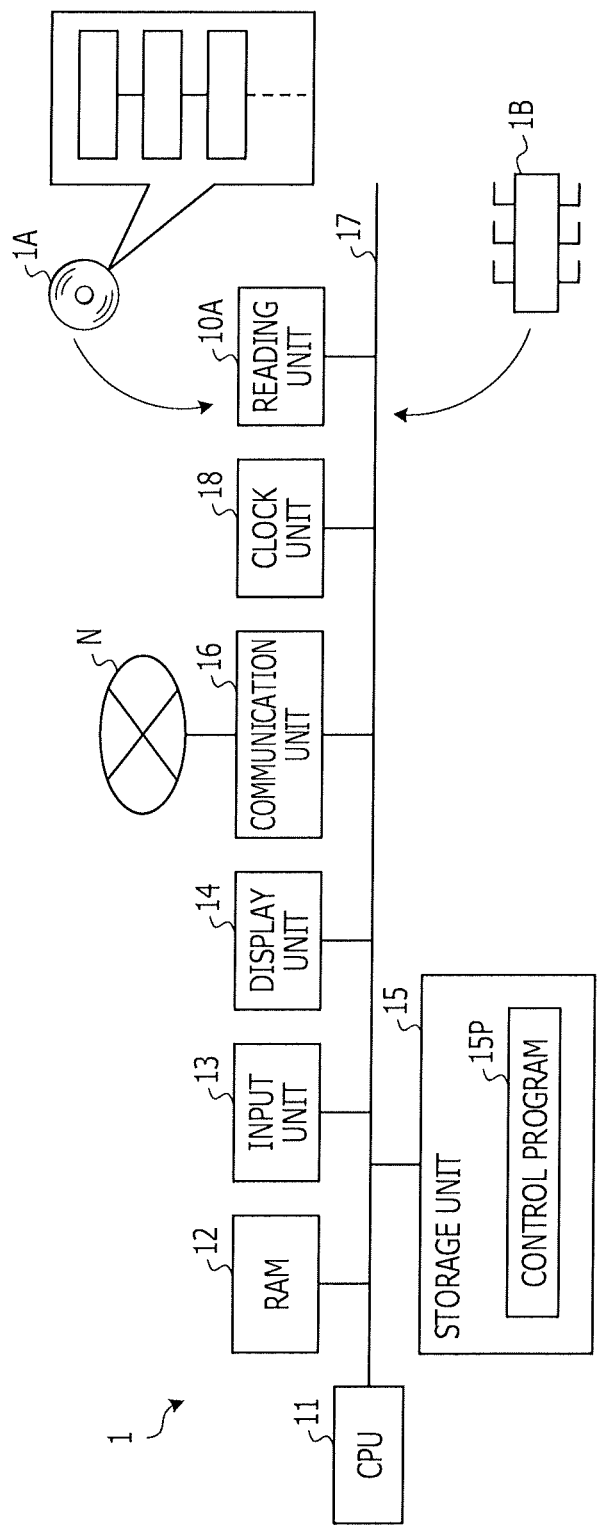
FIG. 20 is a block diagram illustrating a hardware group of the computer according to a third embodiment.

FIG. 20 is a block diagram illustrating a hardware group of the computer 1 according to a third embodiment. A reading unit 10A such as a disk drive or a memory card slot may be caused to read a portable recording medium 1A such as a CD-ROM, a DVD disk, a memory card, or a USB memory, thereby storing, in the storage unit 15, a program for causing the computer 1 to operate. In addition, a semiconductor memory 1B such as a flash memory, which stores therein the relevant program, may be installed within the computer 1. Furthermore, the relevant program may be downloaded from another server computer (not illustrated) coupled via the communication network N such as the Internet.

The computer 1 illustrated in FIG. 20 reads a program for performing the above-mentioned various kinds of software processing from the portable recording medium 1A or the semiconductor memory 1B or downloads the program from another server computer (not illustrated) via the communication network N. The relevant program is installed as the control program 15P and is loaded into the RAM 12, thereby being executed. For this reason, the relevant program functions as the above-mentioned computer 1.

The present third embodiment is as described above, and the other portions thereof are the same as those of the first or second embodiment. Therefore, the same reference number is assigned to a corresponding portion, and details thereof will be omitted. Note that the above-mentioned individual embodiments may be arbitrarily combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
   a memory; and
   a processor coupled to the memory and the processor configured to:
   acquire a neural network which includes an input layer where training data is input, an output layer where results are output, and a plurality of intermediate layers between the input layer and the output layer,
   divide the neural network into divided neural networks which includes a first divided neural network and a second divided neural network, the first divided neural network including the input layer and the plurality of intermediate layers, the second divided neural network including the plurality of intermediate layers and the output layer,
   train, by using the training data and first outputs from the plurality of intermediate layers, first polynomial neural networks related to the first divided neural network,
   train, by using the first output and second outputs from the output layer, second polynomial neural networks related to the second divided neural network, and
   output another neural network generated by linking the first polynomial neural networks and the second polynomial neural networks.

2. The information processing device according to claim 1, wherein the processor is further configured to proceed arithmetic operations of a multivariable polynomial performed, in parallel arithmetic, by addition circuits and multiplication circuits.

3. The information processing device according to claim 1, wherein the processor is configured to identify
   a degree and a number of intermediate elements of each of the polynomial neural networks, intermediate elements including addition circuits and multiplication circuits, and
   wherein the degree and the number of intermediate elements of each of the polynomial neural networks are identified without exceeding an upper limit number of the number of intermediate elements.

4. The information processing device according to claim 3, wherein the processor is configured to calculate, based on input-output characteristics of the divided neural networks, loss functions of the respective polynomial neural networks,
   wherein the processor is configured to determine whether or not each of the calculated loss functions are greater than a threshold value, and
   wherein the processor is configured to change, in a case where one of the calculated loss functions is greater than the threshold value, a corresponding one of the degrees and a corresponding one of the numbers of intermediate elements.

5. The information processing device according to claim 4, wherein
   the processor is configured to identify weighting parameters, and
   the weighting parameters are calculated based on gradients calculated from the loss functions.

6. The information processing device according to claim 4, wherein, in a case where one of the loss functions after changing a corresponding one of the degrees and a corresponding one of the numbers of intermediate elements is greater than the threshold value, a corresponding one of the divided polynomial neural networks is further divided.

7. The information processing device according to claim 4, wherein the linking is a process for linking the polynomial neural networks identified based on parameters for which the loss functions are less than or equal to the threshold value.

8. An information processing method executed by a computer, the method comprising:
   acquiring a neural network which includes an input layer where training data is input, an output layer where results are output, and a plurality of intermediate layers between the input layer and the output layer;
   dividing the neural network into divided neural networks which includes a first divided neural network and a second divided neural network, the first divided neural network including the input layer and the plurality of intermediate layers, the second divided neural network including the plurality of intermediate layers and the output layer;
   training, by using the training data and first outputs from the plurality of intermediate layers, first polynomial neural networks related to the first divided neural network;
   training, by using the first output and second outputs from the output layer, second polynomial neural networks related to the second divided neural network; and
   outputting another neural network generated by linking the first polynomial neural networks and the second polynomial neural networks.

9. A non-transitory computer-readable medium storing a program that causes a computer to execute a process comprising:
- acquiring a neural network which includes an input layer where training data is input, an output layer where results are output, and a plurality of intermediate layers between the input layer and the output layer;
- dividing the neural network into divided neural networks which includes a first divided neural network and a second divided neural network, the first divided neural network including the input layer and the plurality of intermediate layers, the second divided neural network including the plurality of intermediate layers and the output layer;
- training, by using the training data and first outputs from the plurality of intermediate layers, first polynomial neural networks related to the first divided neural network;
- training, by using the first output and second outputs from the output layer, second polynomial neural networks related to the second divided neural network; and
- outputting another neural network generated by linking the first polynomial neural networks and the second polynomial neural networks.

* * * * *